United States Patent
Nohl et al.

(10) Patent No.: US 6,702,190 B1
(45) Date of Patent: Mar. 9, 2004

(54) HEAT TRANSFER SYSTEM FOR A VEHICLE

(75) Inventors: John P. Nohl, Indianapolis, IN (US); Anthony Morales, Columbus, IN (US)

(73) Assignee: Arvin Technologies, Inc., Troy, MI (US)

(*) Notice: Subject to any disclaimer, the term of this patent is extended or adjusted under 35 U.S.C. 154(b) by 0 days.

(21) Appl. No.: 10/178,575

(22) Filed: Jun. 24, 2002

Related U.S. Application Data
(60) Provisional application No. 60/302,405, filed on Jul. 2, 2001.

(51) Int. Cl.[7] .................................................. B60H 1/02
(52) U.S. Cl. .................................... 237/12.3 C; 165/41
(58) Field of Search ....................... 237/12.3 C, 12.3 R; 165/41, 42; 123/142.5 R (56) References Cited

U.S. PATENT DOCUMENTS

| | | | |
|---|---|---|---|
| 1,745,492 A | * 2/1930 | Kelch et al. ................ 165/51 |
| 1,762,465 A | 6/1930 | Bovey |
| 2,063,436 A | 12/1936 | Hild |
| 2,076,287 A | 4/1937 | Arnold |
| 2,486,429 A | 11/1949 | Monnet |
| 2,529,915 A | 11/1950 | Chausson |
| 3,201,934 A | * 8/1965 | Smith .......................... 60/320 |
| 3,280,903 A | * 10/1966 | Stoddard, Jr. ............. 165/135 |
| 3,404,731 A | * 10/1968 | Cushman ..................... 165/51 |
| 3,662,542 A | 5/1972 | Streb |
| 3,730,229 A | 5/1973 | D'Onofrio |
| 3,777,343 A | 12/1973 | D'Onofrio |
| 4,171,015 A | 10/1979 | Bucey et al. |
| 4,249,375 A | 2/1981 | Grundmann et al. |
| 4,266,602 A | 5/1981 | White et al. |
| 4,305,354 A | 12/1981 | Majkrzak |
| 4,363,353 A | 12/1982 | Pranaitis |
| 4,377,083 A | 3/1983 | Shepherd et al. |
| 4,391,235 A | * 7/1983 | Majkrzak .............. 123/142.5 R |
| 4,426,844 A | 1/1984 | Nakano |
| 4,449,581 A | 5/1984 | Blystone et al. |
| 4,450,932 A | * 5/1984 | Khosropour et al. ......... 181/211 |
| 4,514,997 A | 5/1985 | Zifferer |
| 4,573,528 A | 3/1986 | Trepaud |
| 4,589,374 A | 5/1986 | Farina |
| 4,621,687 A | 11/1986 | Ikuta et al. |
| 4,681,155 A | 7/1987 | Kredo |
| 4,685,430 A | 8/1987 | Ap |
| 4,705,105 A | 11/1987 | Cur |
| 4,768,583 A | 9/1988 | Tsukamoto et al. |
| 4,777,796 A | 10/1988 | McEachern, Jr. |
| 4,802,530 A | 2/1989 | Goldstein |
| 4,872,503 A | 10/1989 | Marriner |
| 4,896,830 A | 1/1990 | Takamatsu |
| 4,923,002 A | 5/1990 | Haussmann |

(List continued on next page.)

FOREIGN PATENT DOCUMENTS

WO    WO 00/04333    1/2000

OTHER PUBLICATIONS

"Exhaust Heat Recovery System for Modern Cars,", Diehl et al., SAE Technical Paper Series 2001–01–1020, Mar. 5, 2001, (Reprinted from: Thermal Systems Management and Heat Exchangers, SP–1613)

"Corrugated Tube Heat Exchangers," published before Jul. 2, 2001.

*Primary Examiner*—Derek Boles
(74) *Attorney, Agent, or Firm*—Barnes & Thornburg (57) ABSTRACT

A heat transfer system for transferring heat for use onboard a vehicle includes a conductor arranged to conduct exhaust gas discharged from an engine of the vehicle along a serpentine path to generate back pressure for transmission to the engine so that heat of exhaust gas flowing along the serpentine path is maximized. The heat transfer system includes a tube arranged to conduct fluid so that heat is transferred from the exhaust gas to the fluid.

20 Claims, 6 Drawing Sheets

U.S. PATENT DOCUMENTS

| | | |
|---|---|---|
| 4,924,672 A | 5/1990 | Sekiya et al. |
| 4,934,448 A | 6/1990 | Uemura et al. |
| 4,995,454 A | 2/1991 | Thompson |
| 5,033,264 A * | 7/1991 | Cabral .................. 60/274 |
| 5,046,663 A | 9/1991 | Bittmann |
| 5,192,021 A | 3/1993 | Meier et al. |
| 5,251,693 A | 10/1993 | Zifferer |
| 5,295,303 A | 3/1994 | Ogawa et al. |
| 5,311,935 A | 5/1994 | Yamamoto et al. |
| 5,361,829 A | 11/1994 | Kreutzer et al. |
| 5,417,280 A | 5/1995 | Hayashi et al. |
| 5,447,194 A | 9/1995 | Hayashi et al. |
| 5,517,757 A | 5/1996 | Hayashi et al. |
| 5,582,245 A | 12/1996 | Niimi |
| 5,630,571 A | 5/1997 | Kipp et al. |
| 5,638,898 A | 6/1997 | Gu |
| 5,709,028 A | 1/1998 | Kreutzer et al. |
| 5,753,188 A | 5/1998 | Shimoda et al. |
| 5,762,133 A | 6/1998 | Dion |
| 5,775,413 A | 7/1998 | Kawanabe et al. |
| 5,799,632 A | 9/1998 | Bennett |
| 5,913,289 A | 6/1999 | Gerstmann |
| 5,915,619 A | 6/1999 | Etheve |
| 5,927,393 A | 7/1999 | Richter et al. |
| 5,983,628 A | 11/1999 | Borroni-Bird et al. |
| 6,006,430 A | 12/1999 | Fukuoka et al. |
| 6,032,728 A | 3/2000 | Ross et al. |
| 6,151,891 A | 11/2000 | Bennett |
| 6,155,042 A * | 12/2000 | Perset et al. .................. 60/278 |
| 6,321,533 B1 | 11/2001 | Watanabe et al. |
| 6,327,852 B1 | 12/2001 | Hirose |

* cited by examiner

HEAT TRANSFER SYSTEM FOR A VEHICLE

This application claims priority under 35 U.S.C. 119(e) to U.S. Provisional Application No. 60/302,405, filed Jul. 2, 2001, which is hereby incorporated by reference herein.

BACKGROUND

The present disclosure relates to systems for transferring heat for use onboard a vehicle, and in particular to onboard vehicle heat sources. More particularly, the present disclosure relates to heat exchangers for motor vehicle exhaust.

Vehicles have systems for managing heat. Some of these systems are used to recover heat from vehicle exhaust gas. The recovered heat is then used to heat desired regions of the vehicles.

SUMMARY

A heat transfer system in accordance with the present disclosure is to be carried onboard a motor vehicle to extract heat from a heat source and to transfer the extracted heat to a heat carrier. The heat source is, for example, exhaust gas discharged from the engine of the vehicle and the heat carrier is, for example, liquid engine coolant fluid which carries the heat extracted from exhaust gas to a vehicle heating and defrosting system, for example, to warm a passenger cabin or defrost a windshield.

To maximize heat transferred from exhaust gas to engine coolant fluid, the heat transfer system induces the engine to work harder to provide a desired output (measured, for example, in rpm's or revolutions per minute). It induces the engine to work harder by routing exhaust gas along a tortuous or serpentine path. This generates a resistance or back pressure felt by the engine as an additional load. When the engine works harder because of this additional load, exhaust gas discharged from the engine is hotter. Hotter exhaust gas means that more heat is transferred from exhaust gas to engine coolant fluid causing the engine coolant fluid to be hotter also. When engine coolant fluid is hotter, the passenger cabin can be heated more quickly and the windshield can be defrosted more quickly. This is particularly useful in cold weather.

The heat transfer system includes exhaust conductor means for conducting exhaust gas discharged from an engine along a serpentine path to generate back pressure for transmission to the engine discharging exhaust gas to an annular outer exhaust gas passageway so that heat of exhaust gas discharged into the annular outer exhaust gas passageway is maximized. The serpentine path passes in series through the annular outer exhaust gas passageway in a first direction, an annular intermediate exhaust gas passageway in a second direction opposite to the first direction, and an inner exhaust gas passageway in the first direction. The heat transfer system further includes fluid conductor means for conducting a fluid through the outer exhaust gas passageway to heat the fluid using heat from the exhaust gas passing through the annular outer exhaust gas passageway and providing the heated fluid for use in a vehicle heating and defrosting system onboard the vehicle.

The exhaust conductor means includes three tubes which can be referred to as a housing, an intermediate tube, and an inner tube. The housing surrounds the intermediate tube and the inner tube, and the intermediate tube surrounds the inner tube. The housing and the intermediate tube cooperate to provide the outer exhaust gas passageway therebetween. The intermediate tube and the inner tube cooperate to provide the intermediate exhaust gas passageway therebetween. The inner tube is formed to include the inner exhaust gas passageway.

The fluid conductor means is a coil extending through the outer exhaust gas passageway. The coil surrounds the intermediate and inner tubes.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF DRAWINGS

Figure 1:
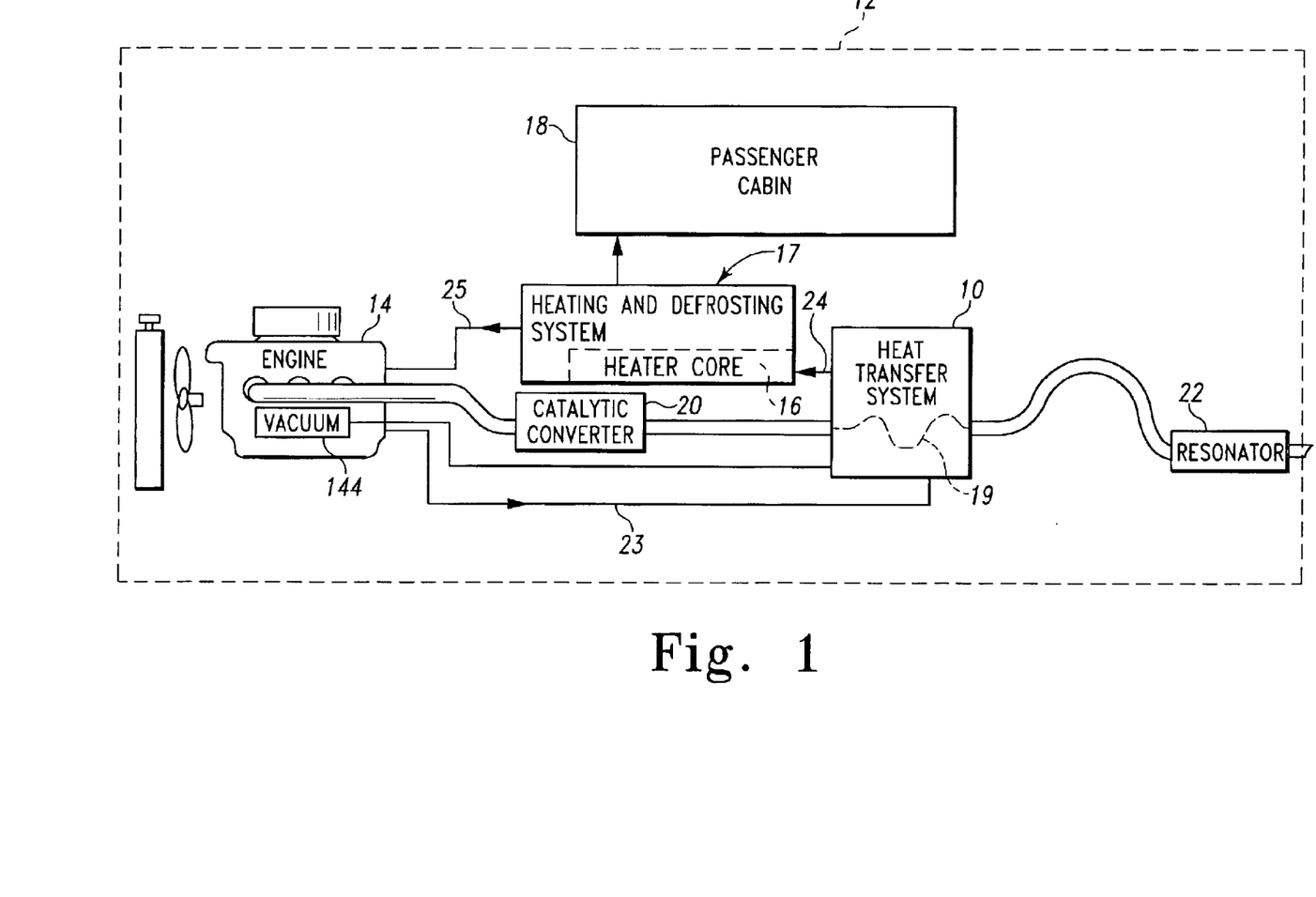
FIG. 1 is a diagrammatic view of a vehicle showing the vehicle including a heat transfer system in communication with an engine to receive exhaust gas discharged from the engine to transfer heat from exhaust gas to engine coolant fluid flowing from the engine through the heat transfer system to a heater core to heat a passenger cabin, for example.
Figure 4:
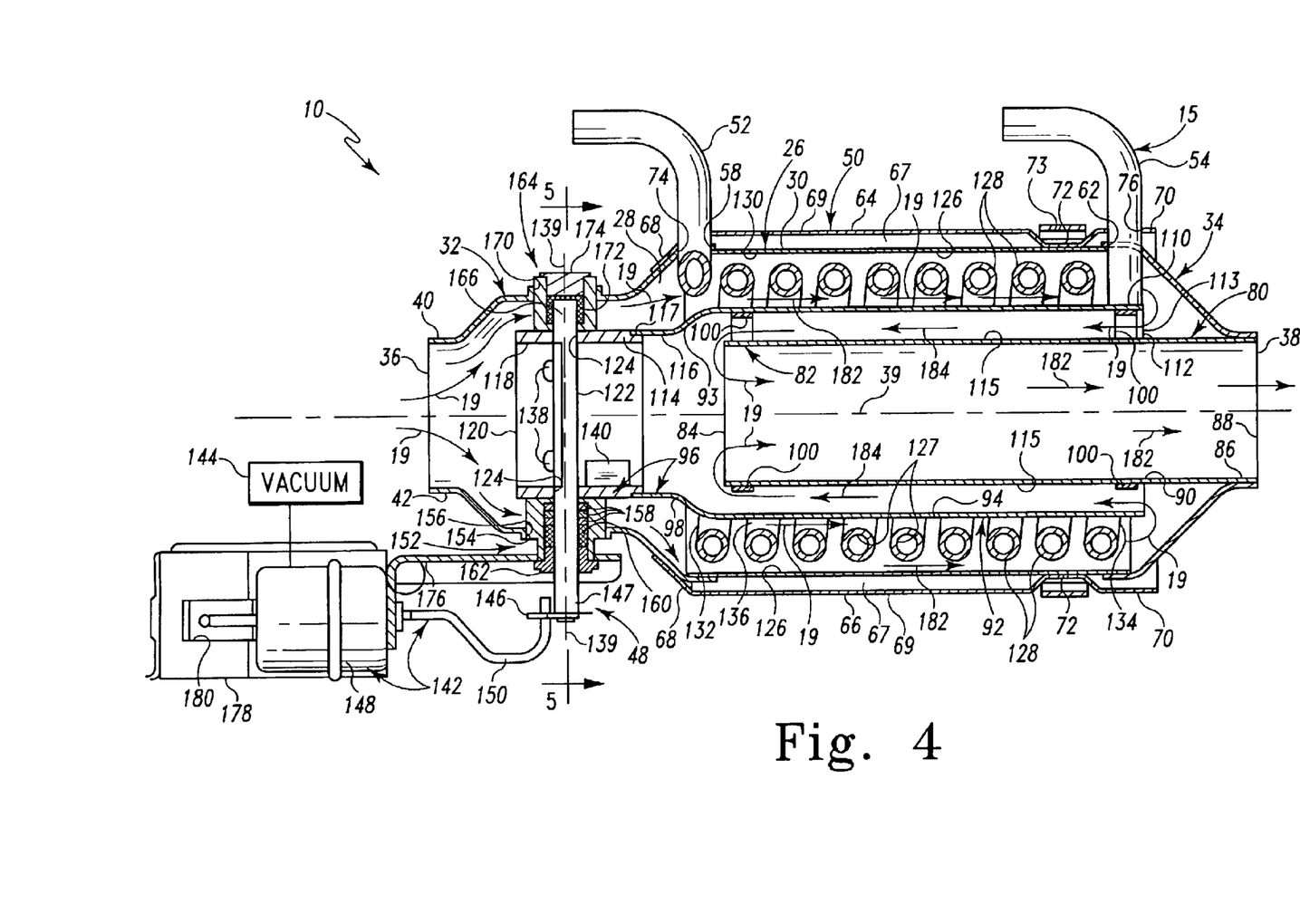
FIG. 4 is a sectional view taken along line 4—4 of FIG. 2 showing exhaust gas being diverted by a closed valve to flow along a serpentine path in the heat transfer system to transfer heat from exhaust gas to fluid flowing through a coil of the heat transfer system.
Figure 5:
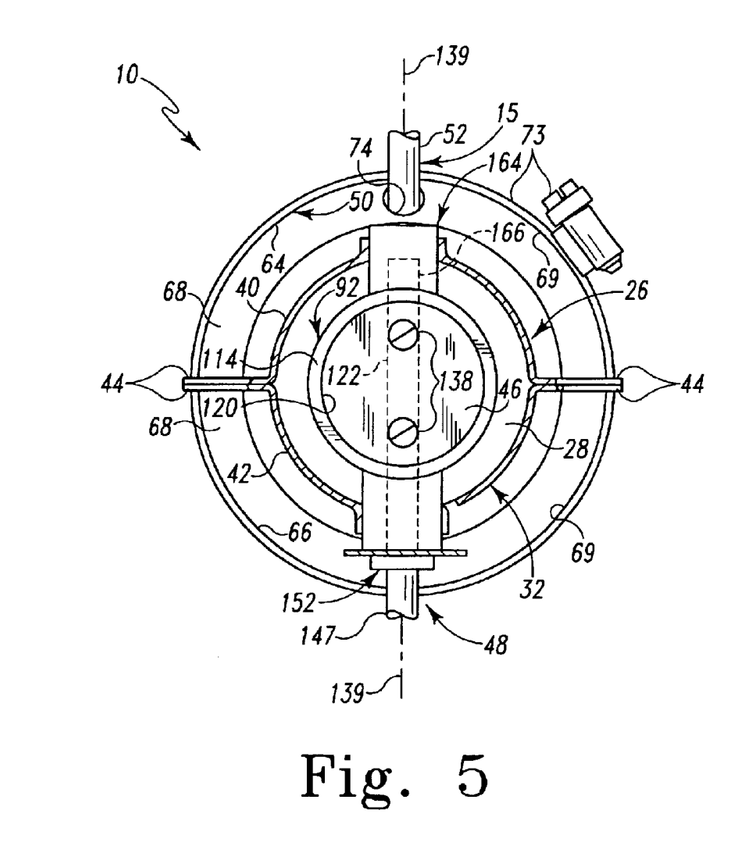
FIG. 5 is a sectional view taken along line 5—5 of FIG. 4 showing the heat transfer system with the valve in its closed position.

A heat transfer system 10 shown in FIG. 1 is carried onboard a vehicle 12 to communicate with a vehicle engine 14 and a heater core 16 of a vehicle heating and defrosting system 17 for warming a passenger cabin 18 and defrosting a windshield (not shown). Heat transfer system 10 is operable in a heat transfer mode, as shown in FIGS. 4 and 5, and a bypass mode, as shown in FIGS. 6 and 7.

In the heat transfer mode, heat transfer system 10 transfers heat from exhaust gas discharged from engine 14 to engine coolant fluid circulating through an outer tube or coil 15 of heat transfer system 10 to provide heat for warming passenger cabin 18 or defrosting the windshield. In doing so, heat transfer system 10 routes exhaust gas along a tortuous or serpentine path 19, as shown in FIG. 4, to generate resistance or back pressure that is transmitted to engine 14. This back pressure causes engine 14 to work harder to provide a desired output (measured, for example, in rpm's or revolutions per minute) than if the back pressure were not present. When engine 14 works harder, transfer of heat from exhaust gas to engine coolant fluid is maximized so that passenger cabin 18 can be warmed quickly and the windshield can be defrosted quickly. This is particularly useful in cold climates and in vehicles having large passenger cabins.

The heat recovered from exhaust gas can further be used to warm up engine 14 to reduce the amount of time needed to reach the activation temperature of the catalyst within a catalytic converter 20 (see FIG. 1) to reduce noxious engine exhaust emissions.

Figure 6:
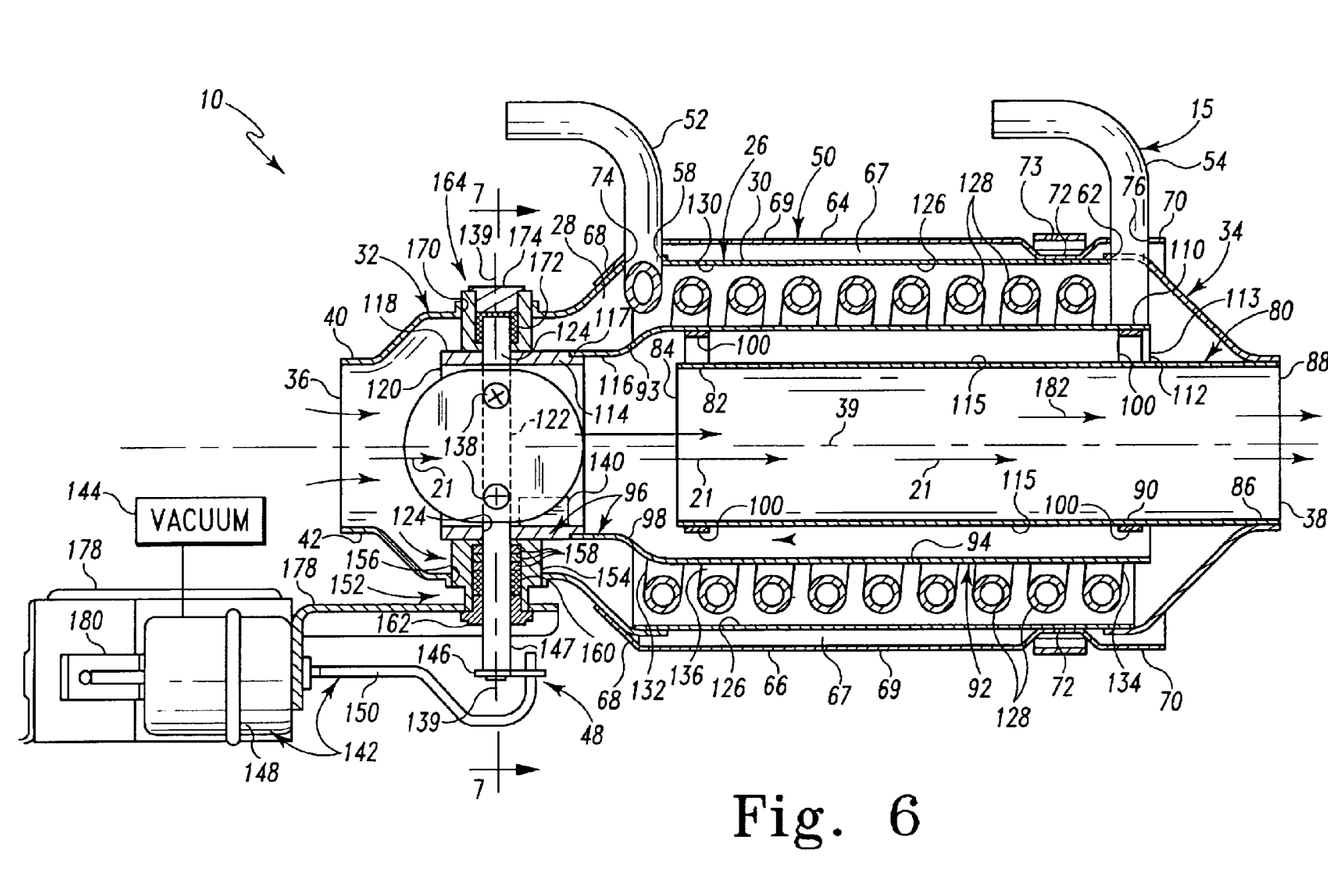
FIG. 6 is a sectional view similar to FIG. 4 showing the valve in an opened position allowing exhaust gas to flow through the heat transfer system without flowing along the serpentine path past the coil.
Figure 7:
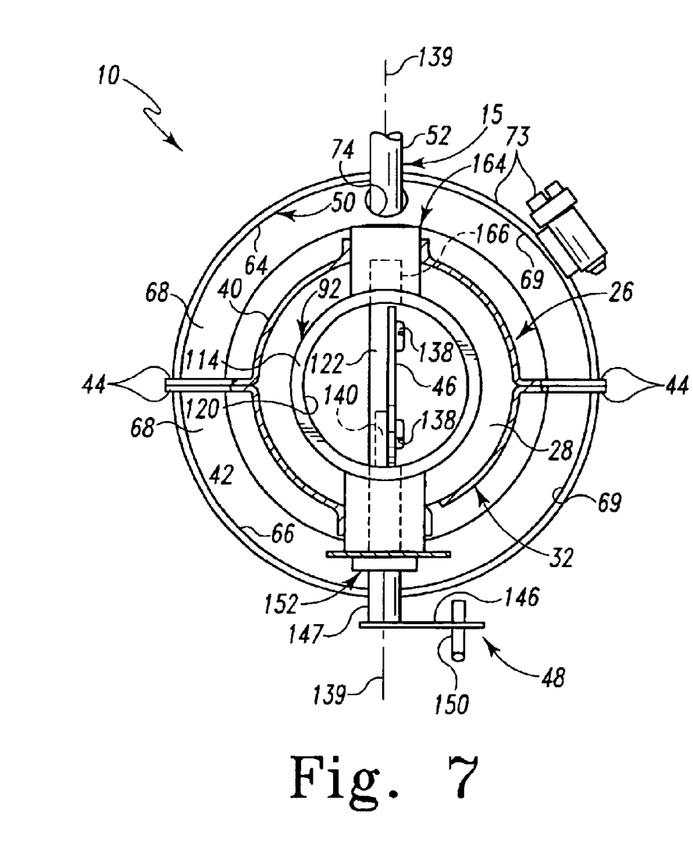
FIG. 7 is a sectional view taken along line 7—7 of FIG. 6 showing the heat transfer system with the valve in its opened position.

In the bypass mode, exhaust gas flows along a generally straight path 21 that bypasses coil 15, as shown in FIG. 6. Flow of exhaust gas along path 21 generates less back pressure than in the heat transfer mode.

Referring to FIG. 1, heat transfer system 10 is positioned in the exhaust and engine coolant systems of vehicle 12. Exhaust gas discharged from engine 14 flows in series from engine 14 through catalytic converter 20, heat transfer system 10, and a resonator 22 or other sound attenuating device to atmosphere. Heat transfer system 10 also receives engine coolant fluid from engine 14 via a first coolant conduit 23 and discharges engine coolant fluid to a second coolant conduit 24. Second coolant conduit 24 conducts engine coolant fluid to heater core 16 to transport heat recovered from exhaust gas in heat transfer system 10 to heater core 16. Engine coolant fluid then returns to engine 14 via a third coolant conduit 25.

Figure 2:
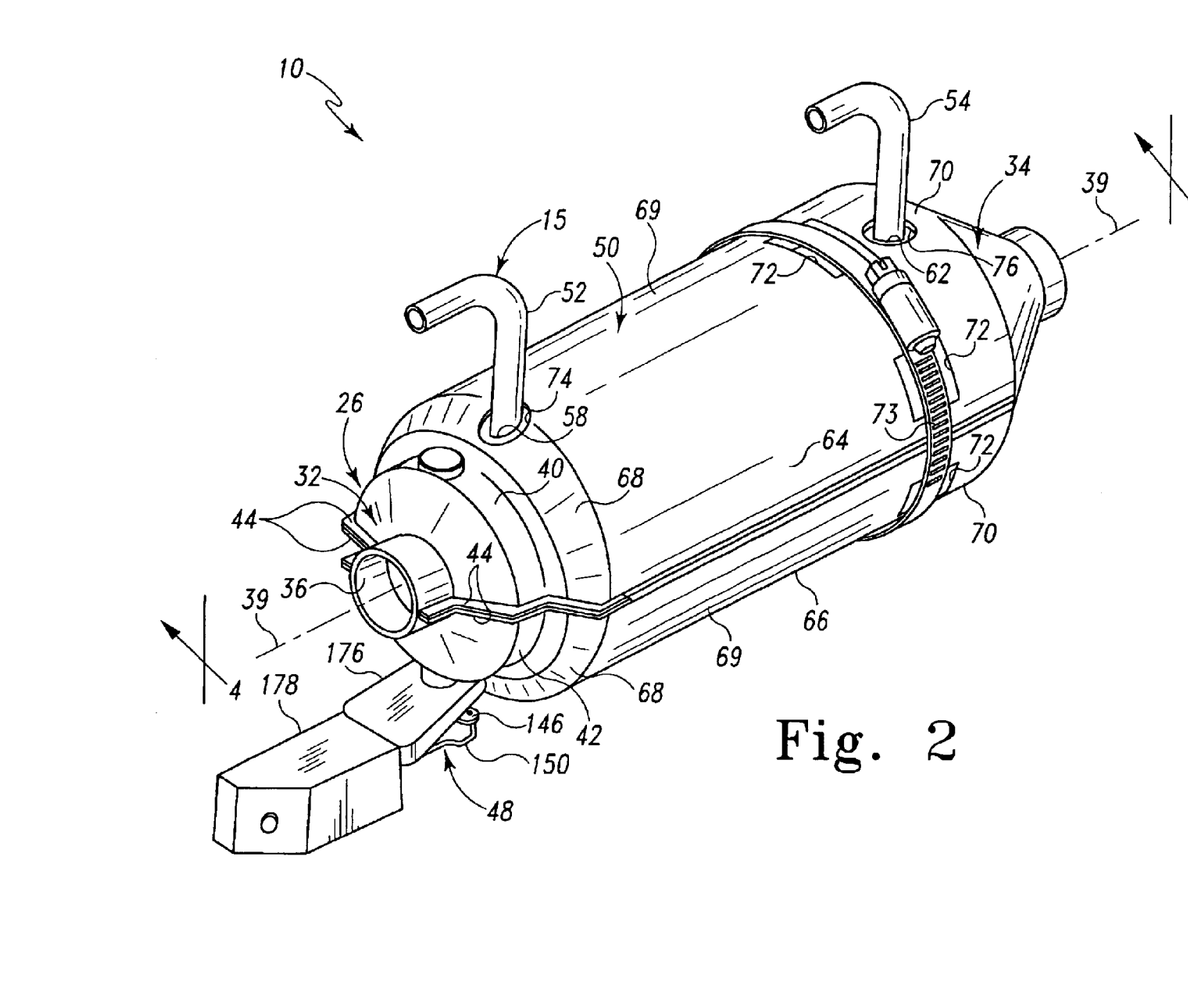
FIG. 2 is a perspective view of the heat transfer system.

Heat transfer system 10 includes a housing 26, as shown in FIGS. 2, 4, and 6. Housing 26 is formed to include an interior region 28 through which exhaust gas and engine coolant fluid is conducted, as discussed in more detail herein. Housing 26 includes a cylindrical shell 30, an inlet cone 32, and an outlet cone 34 which cooperate to provide interior region 28. Inlet cone 32 and outlet cone 34 are welded to opposite ends of shell 30. Inlet cone 32 is formed to include an exhaust gas inlet 36 to admit exhaust gas into interior region 28 and outlet cone 34 is formed to include an exhaust gas outlet 38 to discharge exhaust gas from interior region 28.

Inlet cone 32 includes first and second cone components 40, 42, as shown in FIGS. 2, 3, 5, and 7, which are welded together along external flanges 44 to provide inlet cone 32. Components 40, 42 are further welded to shell 30 to capture a valve 46 and components of a valve actuator 48 in interior region 28.

Figure 3:
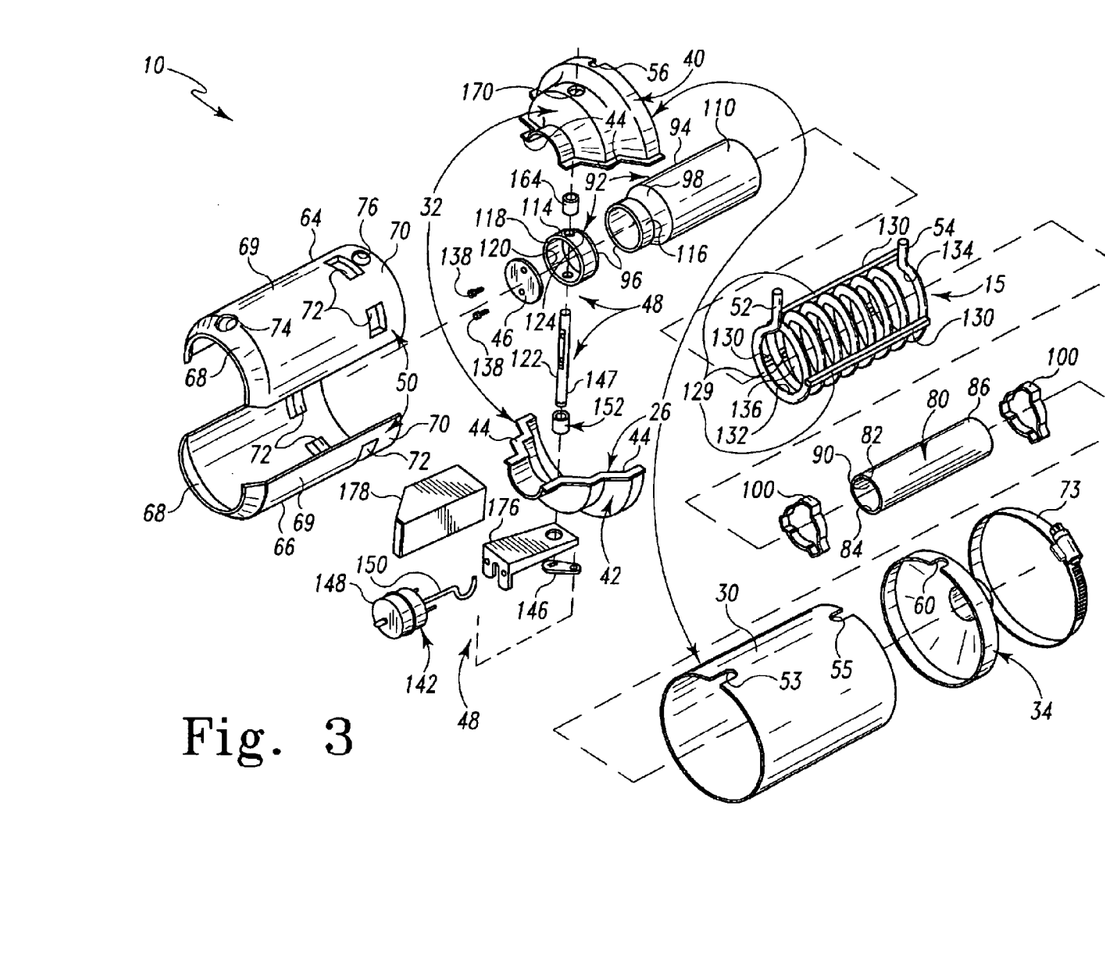
FIG. 3 is an exploded perspective view of the heat transfer system showing components thereof.

Shell 30 and cones 32, 34 are configured so that end portions 52, 54 of coil 15 can extend therethrough, as shown in FIGS. 4 and 6. Shell 30 is formed to include notches 53, 55 at opposite ends of shell 30, as shown in FIG. 3. Component 40 of inlet cone 32 is formed to include a notch 56 (see FIG. 3) that cooperates with notch 53 to provide a coil-receiving aperture 58 (see FIGS. 3, 4, and 6) through which end portion 52 of coil 15 extends. Outlet cone 34 is formed to include a notch 60 (see FIG. 3) that cooperates with notch 55 to provide another coil-receiving aperture 62 (see FIGS. 3, 4, and 6) through which end portion 54 of coil 15 extends.

Heat transfer system 10 includes a heat shield 50, as shown in FIGS. 2–7, that surrounds shell 30. First and second shield components 64, 66 cooperate to provide shield 50 and a thermally insulating air gap 67 between shell 30 and radially outer portions 69 of components 64, 66. Air gap 67 inhibits loss of heat from interior region 28 to maximize transfer of heat from exhaust gas to engine coolant fluid. Each component 64, 66 includes a beveled end portion 68 welded to inlet cone 32 and an opposite end portion 70 spaced radially outwardly apart from outlet cone 34. Each component 64, 66 further includes circumferentially spaced standoffs 72 that are adjacent end portions 70 and engage an exterior surface of shell 30.

A band clamp 73 shown in FIGS. 2–7 wraps around shield components 64, 66. Clamp 73 is positioned over standoffs 72 and tightened to press standoffs 72 against the exterior surface of shell 30. Clamp 73 is loose enough, however, about components 64, 66 to allow standoffs 72 to slide along the exterior surface of shell 30 in response to different rates of thermal expansion between shell 30 and shield 50.

First shield component 64 is formed to include a first coil-receiving aperture 74 and a second coil-receiving aperture 76, as shown in FIGS. 2–4 and 6 End portions 52, 54 of coil extend through apertures 74, 76, respectively.

Heat transfer system 10 includes a cylindrical inner tube 80 positioned in interior region 28, as shown in FIGS. 3, 4, and 6. Tube 80 includes an inlet end portion 82 formed to include an exhaust gas inlet aperture 84 and an outlet end portion 86 formed to include an exhaust gas outlet aperture 88. Outlet end portion 86 is welded to outlet cone 34. Tube 80 is formed to include an inner exhaust gas passageway 90 to conduct exhaust gas from inlet aperture 84 to outlet aperture 88 so that exhaust gas is discharged from heat transfer system 10 through exhaust gas outlet 38.

Heat transfer system 10 includes an intermediate tube 92 positioned in interior region 28, as shown in FIGS. 3–6. Tube 92 includes a first end portion 110 formed to include a first exhaust gas aperture 112 and a second end portion 118 formed to include a second exhaust gas aperture 120. Tube 92 is formed to include an interior exhaust gas passageway 93 extending between first and second exhaust gas apertures 112, 120. Inner tube 80 extends through aperture 112 into interior exhaust gas passageway 93 so that intermediate tube 92 and inner tube 80 cooperate to provide an annular exhaust gas aperture 113 therebetween in aperture 112 and an annular intermediate exhaust gas passageway 115 therebetween in communication with aperture 113 and inlet aperture 84 of inner tube 80.

Tube 92 includes a larger portion 94, a smaller portion 96, and a transition portion 98 between larger portion 94 and smaller portion 96. Portion 94 includes end portion 110 and surrounds inner tube 80. Portion 94 is spaced apart from inner tube 80 by a pair of tri-lobed spacers 100 engaging portion 94 and inner tube 80.

Smaller portion 96 includes first and second sleeve portions 114, 116 which are welded together at an interface 117, as shown in FIGS. 4 and 6. Second sleeve portion 116, transition portion 98, and larger portion 94 are formed monolithically with one another. First sleeve portion 114 includes second end portion 118. Valve 46 is positioned within first sleeve portion 114 to open and close aperture 120 in response to rotation of a valve actuator shaft 122 which extends through opposite shaft-receiving apertures 124 formed in first sleeve portion 114.

Coil 15 extends through an annular outer exhaust gas passageway 126 formed between housing 26 and intermediate tube 92, as shown in FIGS. 4 and 6. Coil 15 is formed to include an outer tube passageway or coil passageway 127 through which engine coolant fluid flows. Coil 15 is configured to block fluid communication between engine coolant fluid flowing through coil 15 and exhaust gas flowing through passageway 126.

Coil 15 includes a plurality of convolutions 128, as shown in FIGS. 3, 4, and 6. Convolutions 128 are positioned in passageway 126 and surround intermediate tube 92 and inner tube 80. Convolutions 128 are coupled to a coil mount 129 (see FIG. 3) having three mounting elements 130. Elements 130 are spaced about 120° apart from one another and coupled to an interior surface of shell 30. Elements 130 space convolutions 128 apart from housing 26 and intermediate tube 92 to allow flow of exhaust gas between convolutions 128 and housing 26 and between convolutions 128 and intermediate tube 92 to maximize heat transfer from exhaust gas flowing through passageway 126 to engine coolant fluid flowing through coil passageway 127. Each element 130 is, for example, a straight rod extending parallel to a longitudinal axis 39 of heat transfer system 10.

Convolutions 128 cooperate to provide a first tube-receiving aperture 132, a second tube-receiving aperture 134, and a central region 136 extending between apertures 132, 134, as shown in FIGS. 4 and 6. Inner and intermediate tubes 80, 92 extend into central region 136. Intermediate tube 92 extends through apertures 132, 134.

Housing 26, convolutions 128, inner tube 80, intermediate tube 92, and heat shield 50 are concentric, as shown in FIGS. 4 and 6. Axis 39 provides the central axis for each of housing 26, convolutions 128, tubes 80, 92, and heat shield 50 which surrounds housing 26, convolutions 128, and tubes 80, 92.

Valve 46 is coupled to valve actuator 48 for movement between a closed position, as shown in FIG. 4, and a normally opened position, as shown in FIG. 6. Valve 46 is a disk-shaped butterfly valve coupled to shaft 122 by a pair of fasteners 138 for rotation about a shaft axis 139 of shaft 122 between the closed and opened positions. A stop 140 extends radially inwardly from an interior surface of first sleeve portion 114 for engagement with valve 46 to stop rotation of valve 46 when valve 46 reaches its opened position.

Valve actuator 48 includes a pneumatic motor 142 coupled to engine vacuum 144 of engine 14 and an arm 146 coupled to motor 142 and a proximal end portion 147 of shaft 122, as shown in FIGS. 4 and 6, to rotate shaft 122 and, thus, valve 46 from the closed position to the opened position. Motor 142 and arm 146 are positioned outside of interior region 28.

Motor 142 includes a pneumatic cylinder 148 coupled to vacuum 144 for fluid communication therewith and a piston 150 movable relative to cylinder 148 and coupled to arm 146. Piston 150 retracts into cylinder 148 against a biasing force from an internal spring (not shown) inside cylinder 148 when cylinder 148 is placed in fluid communication with vacuum 144. Retraction of piston 150 rotates valve 46 to its closed position. Piston 150 extends from cylinder 148 in response to the biasing force from the internal spring so that valve 46 automatically moves to its opened position when vacuum 144 is blocked from fluid communication with cylinder 148.

A first shaft mount 152 of valve actuator 48 supports proximal end portion 147 for rotation therein, as shown in FIGS. 4 and 6. Mount 152 includes a sleeve 154 that is coupled to first sleeve portion 114 and second cone component 42 and extends into a sleeve-receiving aperture 156 of component 42. Mount 152 further includes three labyrinth seals 158, a wire mesh bushing 160, and a cap 162 within sleeve 154. Proximal end portion 147 extends through sleeve 154, seals 158, bushing 160, and cap 162 for rotation.

A second shaft mount 164 of valve actuator 48 supports a distal end portion 166 for rotation therein, as shown in FIGS. 4 and 6. Mount 164 includes a sleeve 168 that is coupled to first sleeve portion 114 and first cone component 40 and extends into a sleeve-receiving aperture 170 of component 40. Mount 164 further includes a wire mesh bushing 172 and a cap 174 within sleeve 168. Distal end portion 166 extends into sleeve 168 and bushing 172 for rotation.

Pneumatic cylinder 148 is coupled to a mounting bracket 176 and a cylinder heat shield 178, as shown in FIGS. 4 and 6. Bracket 176 is coupled to sleeve 154 to mount cylinder 148 thereto. Cylinder heat shield 178 protects cylinder 148 from heat radiated from housing 26. A bracket 180 is coupled to shield 178 and abuts cylinder 148 to press it against bracket 176.

In the heat transfer mode of heat transfer system 10, valve actuator 48 orients valve 46 in its closed position, as shown in FIGS. 4 and 5, so that exhaust gas flows along serpentine path 19 through interior region 28 to induce engine 14 to work harder than when valve 46 is in its opened position. In the closed position, valve 46 blocks flow of exhaust gas through aperture 120 so that exhaust gas which has entered interior region 28 through inlet 36 is diverted radially outwardly into outer exhaust gas passageway 126. Exhaust gas flowing through outer exhaust gas passageway 126 flows in a first direction indicated by arrows 182 in FIG. 4 and past convolutions 128 to transfer heat from exhaust gas to engine coolant fluid flowing through coil passageway 127.

After flowing through outer exhaust gas passageway 126, exhaust gas turns around 180° as it flows radially inwardly from passageway 126 through aperture 113 into intermediate exhaust gas passageway 115, as shown in FIG. 4. Exhaust gas flowing through intermediate exhaust gas passageway 115 flows in a second direction that is opposite to the first direction and indicated by arrows 184.

After flowing through intermediate exhaust gas passageway 115, exhaust gas turns around 180° again as it flows radially inwardly from passageway 115 through aperture 84 into inner exhaust gas passageway 90, as shown in FIG. 4. Exhaust gas flowing through inner exhaust gas passageway 90 flows in the first direction, as indicated by arrows 182, to outlet 38 where it exits heat transfer system 10. Exhaust gas thus flows along serpentine path 19 as it flows in series through outer exhaust gas passageway 126 in the first direction, through intermediate exhaust gas passageway 115 in the second direction, and through inner exhaust gas passageway 90 in the first direction.

Exhaust gas flowing through interior region 28 along the serpentine path 19 generates back pressure. This back pressure is transmitted upstream in the exhaust gas flow to engine 14 causing engine 14 to work harder to provide a desired rpm output than if the back pressure were not present. When engine 14 works harder, more heat is added to exhaust gas. This additional heat is transported to heat transfer system 10 by exhaust gas discharged from engine 14 to increase transfer of heat to engine coolant fluid so that passenger cabin 18 can be heated more quickly and the windshield of vehicle 12 defrosted more quickly.

In the bypass mode of heat transfer system 10, valve actuator 48 positions valve 46 in the opened position, as shown in FIGS. 6 and 7. In the opened position, valve 46 opens aperture 120 so that exhaust gas which has entered interior region 28 through inlet 36 flows along path 21 in the first direction 182 through aperture 120, interior exhaust gas passageway 93, inner exhaust gas passageway 90, and outlet 38 to bypass coil 15. As a result, heat transfer system 10 generates less back pressure when valve 46 is in its opened position than when valve 46 is in its closed position.

Housing 26, inner tube 80, intermediate tube 92, valve 46, and coil mount 129 cooperate to provide a conductor or exhaust conductor means for conducting exhaust gas discharged from engine 14 in series along serpentine path 19 through annular outer exhaust gas passageway 126 in the first direction, annular intermediate exhaust gas passageway 115 in the second direction opposite to the first direction, and inner exhaust gas passageway 90 in the first direction to generate back pressure for transmission to engine 14 discharging exhaust gas to annular outer exhaust gas passageway 126 so that heat of exhaust gas discharged into annular outer exhaust gas passageway 126 is maximized.

Coil 15 provides fluid conductor means for conducting fluid through outer exhaust gas passageway 126 to heat the fluid using heat from the exhaust gas and providing the heated fluid for use onboard vehicle 12.

In some embodiments, vehicle 12 has a control system (not shown) to determine when to move valve 46 between its opened and closed positions. The control system activates valve actuator 48 to position valve 46 in the closed position when the control system detects that the temperature of heated fluid upstream from heat transfer system 10 is below a predetermined temperature (e.g., 170° Fahrenheit). When the control system detects that the heated fluid temperature upstream from heat transfer system 10 is above the predetermined temperature, the control system blocks communication between vacuum 144 and cylinder 148 so that valve 46 is moved to its opened position.

What is claimed is:

1. A heat transfer system for transferring heat for use onboard a vehicle, the heat transfer system comprising
    exhaust conductor means for conducting exhaust gas discharged from an engine in series along a serpentine path through an annular outer exhaust gas passageway in a first direction, an annular intermediate exhaust gas passageway in a second direction opposite to the first direction, and an inner exhaust gas passageway in the first direction to generate back pressure for transmission to the engine discharging exhaust gas to the annular outer exhaust gas passageway so that heat of exhaust gas discharged into the annular outer exhaust gas passageway is maximized, and
    fluid conductor means for conducting a fluid through the outer exhaust gas passageway to heat the fluid using heat from the exhaust gas and providing the heated fluid for use onboard a vehicle.

2. The heat transfer system of claim 1, wherein the exhaust conductor means includes a housing formed to include an interior region, an inner tube positioned in the interior region and formed to include the inner exhaust gas passageway, and an intermediate tube positioned in the interior region and surrounding the inner tube, the housing and the intermediate tube cooperate to provide the outer exhaust gas passageway therebetween, and the intermediate tube and the inner tube cooperate to provide the intermediate exhaust gas passageway therebetween.

3. The heat transfer system of claim 2, wherein the intermediate tube is formed to include an aperture and the exhaust conductor means includes a valve positioned in the interior region for movement relative to the intermediate tube between a closed position closing the aperture so that exhaust gas discharged from the engine flows in series along the serpentine path through the outer exhaust gas passageway and past the fluid conductor means, through the intermediate exhaust gas passageway, and through the inner exhaust gas passageway to transfer heat from the exhaust gas to the fluid and an opened position opening the aperture so that exhaust gas discharged from the engine flows through the aperture and the inner exhaust gas passageway to bypass the fluid conductor means.

4. The heat transfer system of claim 2, wherein the fluid conductor means is a coil extending through the outer exhaust gas passageway.

5. The heat transfer system of claim 4, wherein the coil includes convolutions providing a central region and the inner tube extends into the central region so that the convolutions surround the inner tube.

6. The heat transfer system of claim 4, wherein the coil includes convolutions providing a central region and the intermediate tube extends into the central region so that the convolutions surround the intermediate tube.

7. The heat transfer system of claim 4, wherein the coil includes convolutions providing a central region and the inner tube and the intermediate tube extend into the central region so that the convolutions surround the inner tube and the intermediate tube.

8. The heat transfer system of claim 4, further comprising a heat shield surrounding the housing, the coil, the intermediate tube, and the inner tube and cooperating with the housing to provide a thermally insulating air space therebetween to inhibit loss of heat from exhaust gas flowing through the interior region to atmosphere.

9. The heat transfer system of claim 4, wherein the housing, the coil, the intermediate tube, and the inner tube are concentric.

10. The heat transfer system of claim 4, wherein the coil includes convolutions spaced apart from the housing and the intermediate tube to allow exhaust gas discharged from the engine to flow between the convolutions and the housing and between the convolutions and the intermediate tube.

11. The heat transfer system of claim 10, wherein the exhaust conductor means includes a coil mount that is coupled to the housing and the convolutions and positions the convolutions in the outer exhaust gas passageway between the housing and the intermediate tube.

12. The heat transfer system of claim 4, wherein the housing includes a shell surrounding the coil, the intermediate tube, and the inner tube, an inlet cone coupled to the shell and arranged to admit exhaust gas into the interior region, and an outlet cone coupled to the shell and arranged to discharge exhaust gas from the interior region, the shell, the inlet cone, and the outlet cone cooperate to provide the interior region, the shell is formed to include a first notch and a second notch, the inlet cone is formed to include a third notch cooperating with the first notch to provide an aperture through which the coil extends from the interior region to a location outside the interior region, and the outlet cone is formed to include a fourth notch cooperating with the second notch to provide another aperture through which the coil extends from the interior region to another location outside the interior region.

13. The heat transfer system of claim 2, wherein the intermediate tube is formed to include an aperture, the inner tube extends through the aperture and is coupled to the housing, and the exhaust conductor means includes a spacer engaging the intermediate tube and the inner tube to space the intermediate tube and the inner tube apart from one another.

14. The heat transfer system of claim 1, wherein the fluid conductor means is a coil extending through the outer exhaust gas passageway and surrounding the intermediate exhaust gas passageway and the inner exhaust gas passageway.

15. A heat transfer system for transferring heat for use onboard a vehicle, the heat transfer system comprising
    a conductor arranged to conduct exhaust gas discharged from an engine, the conductor including a housing formed to include an interior region, an inner tube positioned in the interior region and formed to include an inner exhaust gas passageway, and an intermediate tube positioned in the interior region and surrounding the inner tube, the housing and the intermediate tube cooperating to provide an outer exhaust gas passageway therebetween, the intermediate tube and the inner tube cooperating to provide an intermediate exhaust gas passageway therebetween and in communication with the outer exhaust gas passageway and the inner exhaust gas passageway, and an outer tube formed to include an outer tube passageway to conduct a fluid therethrough, the outer tube extending through the outer exhaust gas passageway and being configured to block fluid communication between the outer tube passageway and the interior region to transfer heat from exhaust gas discharged from the engine and flowing in series along a serpentine path through the outer exhaust gas passageway and past the outer tube in a first direction, through the intermediate exhaust gas passageway in a second direction opposite to the first direction, and through the inner exhaust gas passageway in the first direction to the fluid flowing through the outer tube passageway for transmission of the heated fluid for use onboard a vehicle, the outer tube surrounding the intermediate tube.

16. The heat transfer system of claim 15, wherein the outer tube is a coil surrounding the inner tube, the housing, the coil, the intermediate tube, and the inner tube are concentric, and the coil is spaced apart from the housing and the intermediate tube to allow exhaust gas discharged from the engine to flow between the coil and the housing and between the coil and the intermediate tube.

17. The heat transfer system of claim 16, wherein the intermediate tube is formed to include an aperture and the conductor includes a valve positioned in the interior region for movement relative to the intermediate tube between a closed position closing the aperture so that exhaust gas discharged from the engine flows in series along the serpentine path through the outer exhaust gas passageway and past the coil, through the intermediate exhaust gas passageway, and through the inner exhaust gas passageway to transfer heat from the exhaust gas to the fluid and an opened position opening the aperture so that exhaust gas discharged from the engine flows through the aperture and the inner exhaust gas passageway to bypass the coil.

18. A heat transfer system for transferring heat for use onboard a vehicle, the heat transfer system comprising
a housing,
an inner tube positioned within the housing and defining an inner exhaust gas passageway,
an intermediate tube positioned within the housing and surrounding the inner tube, the intermediate tube and the housing defining an outer exhaust gas passageway therebetween, the intermediate tube and the inner tube defining an intermediate exhaust gas passageway therebetween, and
a coil defining a coil passageway, the coil being positioned in the outer exhaust gas passageway and surrounding the intermediate tube for transfer of heat from exhaust gas to fluid flowing through the coil passageway upon flow of exhaust gas along a serpentine path, in series, through the outer exhaust gas passageway in a first direction, the intermediate exhaust gas passageway in a second direction opposite to the first direction, and the inner exhaust gas passageway in the first direction.

19. The heat transfer system of claim 18, further comprising a valve mounted for movement to close an aperture in the intermediate tube to direct exhaust gas into the outer exhaust gas passageway to flow along the serpentine path.

20. The heat transfer system of claim 18, further comprising a heat shield surrounding the housing to define a thermally insulating air space between the heat shield and the housing.

* * * * *